(12) United States Patent
Nagata (10) Patent No.: US 9,831,508 B2
(45) Date of Patent: Nov. 28, 2017

(54) FUEL SUPPLY APPARATUS

(71) Applicant: AISAN KOGYO KABUSHIKI KAISHA, Obu-shi, Aichi (JP)

(72) Inventor: Sadatsugu Nagata, Aichi-gun (JP)

(73) Assignee: AISAN KOGYO KABUSHIKI KAISHA, Obu-shi (JP)

( * ) Notice: Subject to any disclaimer, the term of this patent is extended or adjusted under 35 U.S.C. 154(b) by 0 days.

(21) Appl. No.: 14/921,581

(22) Filed: Oct. 23, 2015

(65) Prior Publication Data

US 2016/0161005 A1   Jun. 9, 2016

(30) Foreign Application Priority Data

Dec. 4, 2014  (JP) ................. 2014-245800

(51) Int. Cl.
| | |
|---|---|
| *F02M 51/06* | (2006.01) |
| *H01M 8/04089* | (2016.01) |
| *F02M 61/04* | (2006.01) |
| *F02M 61/12* | (2006.01) |
| *H01M 8/04082* | (2016.01) |

(52) U.S. Cl.
CPC .... *H01M 8/04104* (2013.01); *F02M 51/0667* (2013.01); *F02M 51/0682* (2013.01); *F02M 61/042* (2013.01); *F02M 61/12* (2013.01); *F02M 2200/09* (2013.01); *H01M 8/04201* (2013.01)

(58) Field of Classification Search
CPC ........... F02M 37/0023; F02M 51/0682; F02M 51/0667; H01M 8/04104; F16K 31/0686; F16K 31/0693; F16K 39/022; F16K 31/0606; F16K 31/0651; Y10T 137/877

USPC ........... 251/129.07, 129.15, 129.21; 137/861
See application file for complete search history.

(56) References Cited

U.S. PATENT DOCUMENTS

| | | | | |
|---|---|---|---|---|
| 4,832,312 A | * | 5/1989 | Linder ................. | F02M 59/466 123/458 |
| 6,286,770 B1 | * | 9/2001 | Boaro ................ | F02M 51/0667 239/585.1 |
| 6,755,175 B1 | | 6/2004 | McKay et al. | |

(Continued)

FOREIGN PATENT DOCUMENTS

| | | |
|---|---|---|
| JP | S57-44963 U | 3/1982 |
| JP | 2003-512561 A | 4/2003 |

(Continued)

*Primary Examiner* — Matthew W Jellett
(74) *Attorney, Agent, or Firm* — Oliff PLC (57) ABSTRACT

A fuel injection apparatus includes a valve element provided with a flow passage allowing a fuel to flow therethrough, a valve seat which the valve element will contact with or separate from, and a casing accommodating therein the valve element and the valve seat. During valve opening in which the valve element is separated from the valve seat, the fuel flowing through the flow passage is discharged through a gap between the valve element and the valve seat. A direction in which the valve seat is placed relative to the valve element is the same as a direction of the fuel flowing in the flow passage. The fuel injection apparatus further includes a discharge-side flow passage in which the fuel to be discharged during valve opening is allowed flow. The discharge-side flow passage is formed outside an outer peripheral portion of the valve seat.

8 Claims, 6 Drawing Sheets

(56) References Cited

U.S. PATENT DOCUMENTS

| | | | | |
|---|---|---|---|---|
| 6,918,409 B1 * | 7/2005 | Parker | ................ | F02M 37/0023 |
| | | | | 137/614.11 |
| 7,229,064 B2 * | 6/2007 | Miller | ................ | F02M 51/0667 |
| | | | | 251/129.21 |
| 7,497,232 B2 * | 3/2009 | Muller | .................. | F16K 31/061 |
| | | | | 137/596.17 |
| 2007/0029413 A1 | 2/2007 | Nakajima et al. | | |

FOREIGN PATENT DOCUMENTS

| | | | |
|---|---|---|---|
| JP | 2007-040245 A | 2/2007 | |
| JP | 2012177426 A * | 9/2012 | ............. F16K 31/06 |

* cited by examiner

FUEL SUPPLY APPARATUS

CROSS-REFERENCE TO RELATED APPLICATIONS

This application is based upon and claims the benefit of priority from the prior Japanese Patent Application No. 2014-245800, filed Dec. 4, 2014, the entire contents of which are incorporated herein by reference.

BACKGROUND OF THE INVENTION

Field of the Invention

The present invention relates to a fuel supply apparatus for supply of fuel.

Related Art

A fuel injection device disclosed in Patent Document 1 includes a valve seat provided in a valve housing, a valve member which comes into contact with or separate from the valve seat, and a drive unit for operating the valve member. During valve opening, fuel flows through an annular passage in the valve housing and is sprayed from an injection port located between the valve seat and the valve main unit.

RELATED ART DOCUMENTS

Patent Documents

Patent Document 1: Japanese Translation of PCT International Application Publication No. 2003-512561

SUMMARY OF INVENTION

Problems to be Solved by the Invention

However, the fuel injection device disclosed in Patent Document 1 is configured such that a direction in which the fuel flows in the annular passage in the valve housing and a direction in which the valve member separates from the valve seat are the same. Thus, during valve closing, when the pressure of the fuel (hereinafter, "fuel pressure") in the annular passage formed upstream of the valve seat in the fuel flowing direction rises, the valve member may be separated from the valve seat, resulting in leakage of the fuel from the injection port. To suppress such fuel leakage, accordingly, the drive unit has to be sized up to increase the driving force of the drive unit for operating the valve member.

In the fuel supply apparatus, furthermore, when fuel is to be discharged during valve opening, it is desired to minimize sound or noise (e.g., flow sound or noise) generated when the fuel flows.

The present invention has been made to solve the above problems and has a purpose to provide a fuel supply apparatus capable of preventing fuel leakage even when fuel pressure on an upstream side is high and also reducing sound or noise generated when fuel flows.

Means of Solving the Problems

To achieve the above purpose, one aspect of the invention provides a fuel supply apparatus including a valve element provided with a flow passage which allows fuel to flow therethrough, a valve seat which the valve element comes into contact with or separates from, and a casing accommodating the valve element and the valve seat, wherein the valve element is configured to separate from the valve seat during valve opening to allow the fuel flowing in the flow passage to be discharged through a gap between the valve element and the valve seat, wherein the fuel is allowed to flow in the same direction in the flow passage as a direction in which the valve seat is arranged with respect to the valve element, wherein the fuel supply apparatus further includes a discharge-side passage to allow the fuel to be discharged out during the valve opening, and wherein the discharge-side passage is provided outside of an outer peripheral portion of the valve seat.

According to the foregoing aspect, the fuel pressure on an upstream side of the valve element and in the flow passage acts on the valve element to move toward the valve seat. Therefore, even when the fuel pressure on the upstream side of the valve element is high during valve closing, the sealing strength (hermeticity) of the valve element and the valve seat is ensured and thus fuel leakage can be prevented.

Since the discharge-side passage can be designed to have a large flow passage area, the flow velocity of fuel to be discharged during valve opening can be reduced. Accordingly, sound or noise (e.g., flow sound) generated when the fuel flows can be reduced.

INDUSTRIAL APPLICABILITY

The fuel supply apparatus of the present invention can prevent fuel leakage even when fuel pressure on an upstream side is high and also sound or noise generated when the fuel flow can be reduced.

DESCRIPTION OF EMBODIMENTS

Example 1

A detailed description of a whole structure of a fuel injection apparatus (an injector) which is one example of a fuel supply apparatus of the present invention will now be given referring to the accompanying drawings. The fuel injection apparatus 1 is for example an apparatus for supplying gas fuel (e.g., hydrogen) to a fuel cell (not shown).

Figure 1:
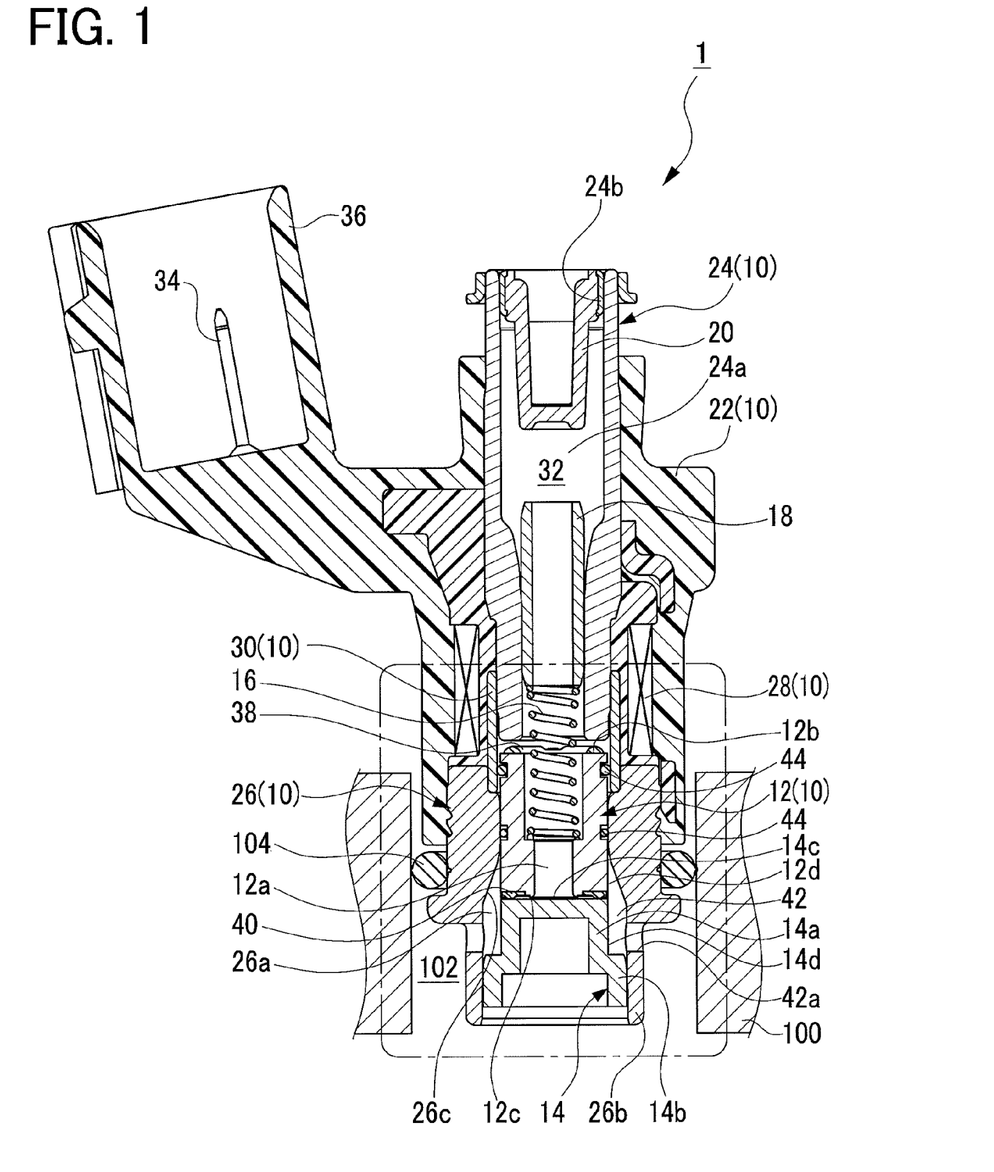
FIG. 1 is a cross sectional view of a fuel injection apparatus in Example 1.

The fuel injection apparatus 1 includes, as shown in FIG. 1, a main unit 10, a valve element 12, a valve seat 14, a compression spring 16, a spring pin 18, and a filter member 20. FIG. 1 shows an example in which the fuel injection apparatus 1 is set in a flow passage 102 of a mating part 100 through an O-ring 104.

The main unit 10 is provided with a housing 22, a stator core 24, a casing 26, an electromagnetic coil 28, a non-magnetic bush 30, and others. This main unit 10 accommodates therein the valve element 12, the valve seat 14, the compression spring 16, the spring pin 18, the filter member 20, and others. The main unit 10 is internally formed with a fuel passage 32 which allows fuel to flow therethrough.

The housing 22 is configured to surround part of the stator core 24, the non-magnetic bush 30, and part of the casing 26. The housing 22 is made of resin, in which the electromagnetic coil 28 is embedded. The electromagnetic coil 28 is placed in a position surrounding the stator core 24. The housing 22 is provided with a connector part 36 in which a plurality of terminal pins 34 are arranged. The terminal pins 34 are electrically connected to the electromagnetic coil 28. The connector part 36 can be connected to an external controller (not shown) through a wiring harness (not shown).

The stator core 24 has a nearly cylindrical shape (including a perfect-circular cylindrical shape, an elliptic cylindrical shape, and so on) and is provided with a through hole 24a in the center. The through hole 24a constitutes an upstream part of the fuel passage 32. An upstream end (an upper end in FIG. 1) of the stator core 24 is connected to an external fuel supply part (not shown). Accordingly, the fuel to be supplied from the fuel supply part is allowed to flow in the through hole 24a (the fuel passage 32) through a fuel inflow port 24b. In the through hole 24a of the stator core 24, the filter member 20 is disposed to remove foreign matters in the fuel. The stator core 24 is made of soft magnetic material (e.g., electromagnetic stainless steel).

A downstream end (a lower end in FIG. 1) of the stator core 24 is inserted in an upstream end of a through hole of the non-magnetic bush 30 having a nearly cylindrical shape. The stator core 24 and the non-magnetic bush 30 are welded to each other over their entire circumferences, so that the through hole 24a of the stator core 24 and the through hole of the non-magnetic bush 30 are hermetically connected to each other. The non-magnetic bush 30 is made of non-magnetic material.

The casing 26 is placed on a downstream side (a lower side in FIG. 1) in a fuel flowing direction with respect to the stator core 24. The casing 26 has a nearly cylindrical shape and is provided with a through hole 26a in the center. The casing 26 and the non-magnetic bush 30 are welded to each other over their entire circumferences, so that the through hole 26a of the casing 26 and the through hole of the non-magnetic bush 30 are hermetically connected to each other. The casing 26 is made of soft magnetic material (e.g., electromagnetic stainless steel).

In the through hole 26a of the casing 26, the valve element 12 is placed in a position on an upstream side (an upper side in FIG. 1) in the fuel flowing direction with respect to the valve seat 14. An upstream end of the valve element 12 is placed in the through hole of the non-magnetic bush 30. The valve element 12 has a nearly cylindrical shape and made of soft magnetic material (e.g., electromagnetic stainless steel). The valve element 12 has a flow passage 12a (a through hole) formed therethrough in an axial direction (an up-down direction in FIG. 1) of the valve element 12. This flow passage 12a is a flow passage that allows fuel to flow therethrough and constitutes part of the fuel passage 32. Specifically, the fuel passage 32 is formed extending from the fuel inflow port 24b to a downstream end of the flow passage 12a of the valve seat 12 via the through hole 24a of the stator core 24, the inside of the spring pin 18, and others.

The valve element 12 is provided with a cushioning member 38 (e.g., cushioning rubber) on an upper end face 12b (on a surface on the side facing to the stator core 24) of the valve element 12.

The valve element 12 is provided with an elastic seat sealing member 40 on a lower end face 12c (on a surface on the side facing to the valve seat 14) of the valve element 12. The seat sealing member 40 is made of for example rubber, resin, or others. When the seat sealing member 40 comes into contact with a seat surface 14c of the valve seat 14, the fuel passage 32 and a discharge-side passage 42 are shut off from each other.

The valve seat 14 is placed in a position downstream of the valve element 12 in the through hole 26a of the casing 26. The valve seat 14 has a nearly cylindrical shape including a small-diameter portion 14a and a large-diameter portion 14b. The diameter of the small-diameter portion 14a is smaller than the diameter of the large-diameter portion 14b. The small-diameter portion 14a is placed on the upstream side and the large-diameter portion 14b is placed on the downstream side. An upstream side portion of the small-diameter portion 14a is closed, forming a seat surface 14c in the fuel flowing direction. The valve seat 14 and the casing 26 are arranged by one of the following ways: (a) press-fitting the large-diameter portion 14b of the valve seat 14 in the casing 26; (b) welding an outer peripheral surface 14d (an outer peripheral portion) of the valve seat 14 and the casing 26 to each other over their entire circumference; and (c) making both press-fitting and welding for ensuring hermeticity. The valve seat 14 is a member which the valve element 12 comes into contact or separates from.

In this example, in the through hole 26a of the casing 26, the discharge-side passage 42 is formed on the outside of the outer peripheral surface 14d of the valve seat 14. An outlet 42a of the discharge-side passage 42 communicates with the outside of the fuel injection apparatus 1. The details of the discharge-side passage 42 will be described later.

The compression spring 16 and the spring pin 18 are arranged in the fuel passage 32. The compression spring 16 is placed extending from the inside of the valve element 12 into an upstream area thereof. The spring pin 18 is placed on the an upstream side of the compression spring 16 and is fixed by press-fitting in the through hole 24a of the stator core 24. An upstream end of the compression spring 16 abuts on the spring pin 18, while a downstream end of the compression spring 16 abuts on the valve element 12. The compression spring 16 is set in a compressed state, urging the valve element 12 against the valve seat 14.

Next, operations (actions) of the fuel injection apparatus 1 will be explained below.

Figure 2:
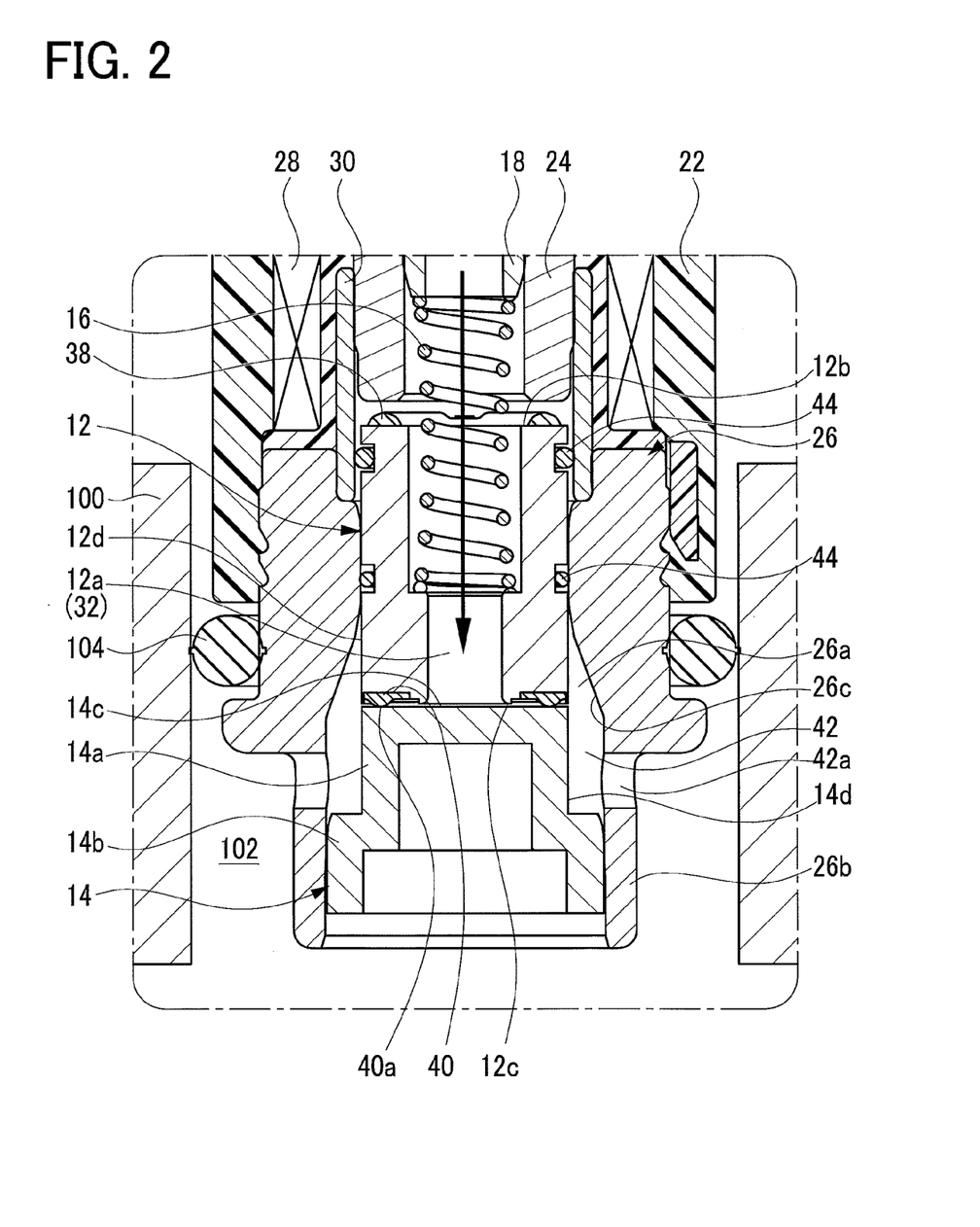
FIG. 2 is an enlarged view of a valve seat and its surrounding parts during valve closing in Example 1.

While no electric power is applied to the electromagnetic coil 28 through the terminal pins 34 of the connector part 36, that is, during valve closing, the seat sealing member 40 of the valve element 12 is held in contact with the seat surface 14c of the valve seat 14 by urging force of the compression spring 16 as shown in FIGS. 1 and 2. At that time, the discharge-side passage 42 is shut off, or disconnected, from the flow passage 12a (the fuel passage 32) of the valve element 12. This blocks the fuel from flowing out through the outlet 42a of the discharge-side passage 42 to the outside of the fuel injection apparatus 1.

Figure 3:
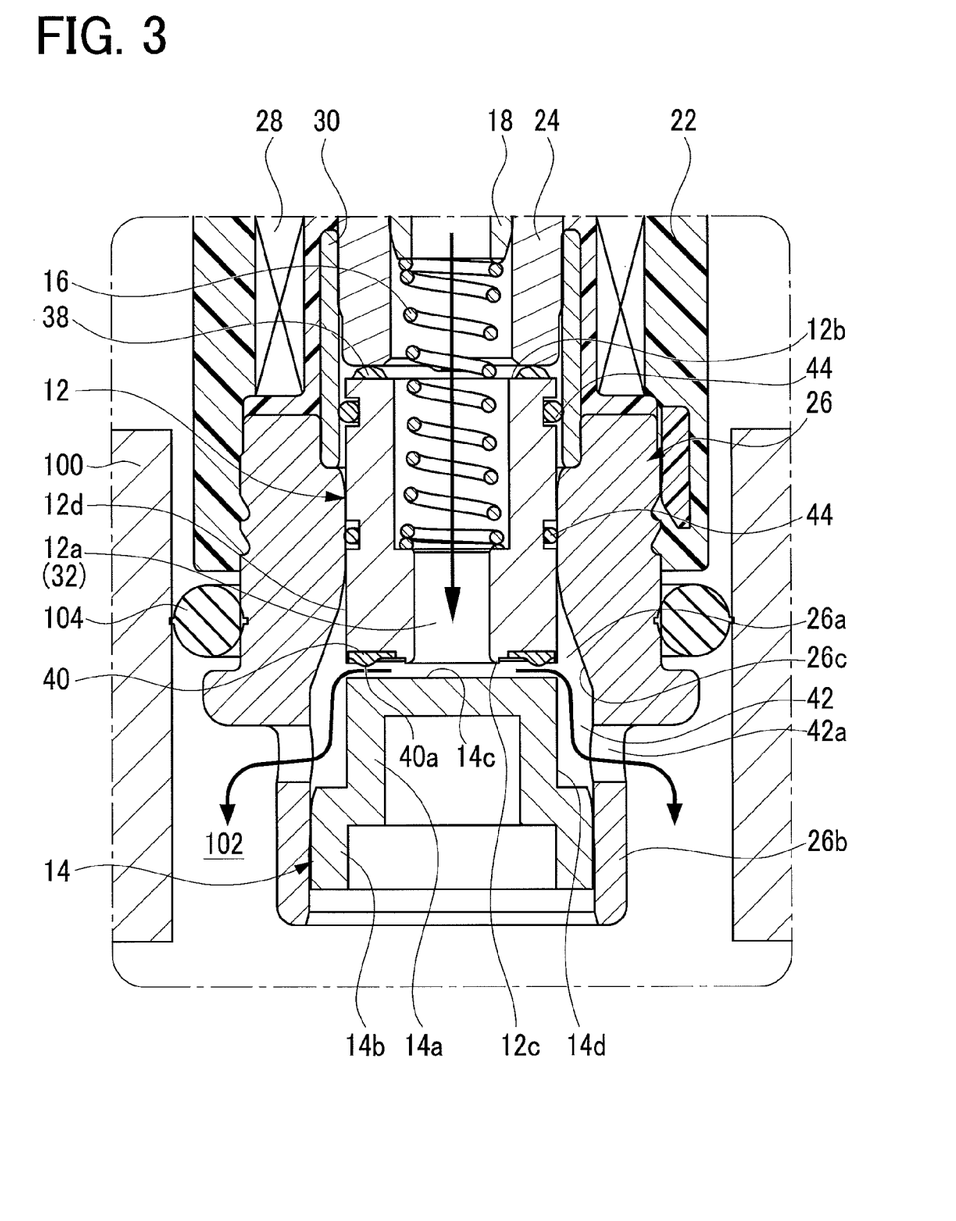
FIG. 3 is an enlarged view of the valve seat and its surrounding parts during valve opening in Example 1.

On the other hand, while power is applied to the electromagnetic coil 28 through the terminal pins 34 of the connector part 36, that is, during valve opening, the electromagnetic coil 28 generates a magnetic field, thereby exciting the valve element 12 and the stator core 24. Then, the valve element 12 and the stator core 24 attract each other and thus the valve element 12 is moved toward the stator core 24 as shown in FIG. 3. Specifically, the seat sealing member 40 of the valve element 12 separates from the seat surface 14c of the valve seat 14. At that time, the discharge-side passage 42 becomes communicated with the flow passage 12a (the fuel passage 32) of the valve element 12 through a gap between the valve element 12 and the valve seat 14. Accordingly, the fuel flowing in the flow passage 12a of the valve element 12 is discharged through the gap between the valve element 12 and the valve seat 14 and flows in the discharge-side passage 42. Consequently, the fuel is discharged out of the fuel injection apparatus 1 through the outlet 42a of the discharge-side passage 42.

Next, the valve element 12, the valve seat 14, and their peripheral structure will be explained.

In this example, the direction in which the valve seat 14 is arranged relative to the valve element 12 and the direction in which the fuel flows on the upstream side of the valve element 12 and in the flow passage 12a are the same. Specifically, in the fuel passage 32, the fuel flows in the direction in which the valve element 12 moves toward the valve seat 14 (a closing direction of the valve element 12, indicated by an arrow in FIG. 2). Accordingly, during valve closing in which the valve element 12 is held in contact with the valve seat 14, even when the fuel pressure on the upstream side of the valve element 12 and in the flow passage 12a is high, the sealing strength (hermeticity) between the seat sealing member 40 of the valve element 12 and the seat surface 14c of the valve seat 14 is ensured, thereby enabling prevention of fuel leakage.

The fuel injection apparatus 1 includes the discharge-side passage 42 that allows the fuel to flow and be discharged through the gap between the valve element 12 and the valve seat 14 during valve opening in which the valve element 12 is separated from the valve seat 14. The discharge-side passage 42 is formed on the outside of the outer peripheral surface 14d of the small-diameter portion 14a of the valve seat 14. To be concrete, the discharge-side passage 42 is defined by the outer peripheral surface 12d of the valve element 12, the outer peripheral surface 14d of the valve seat 14, and the inner peripheral surface 26c of the casing 26 in the through hole 26a of the casing 26. Thus, the discharge-side passage 42 can have a larger flow passage area as compared with the case for example where the discharge-side passage 42 is formed in the seat surface 14c of the valve seat 14. Accordingly, during valve opening, the flow velocity of the fuel to be discharged through the gap between the valve element 12 and the valve seat 14 is reduced. This can reduce fuel flowing noise (a sound generated when the fuel flows).

The discharge-side passage 42 is formed extending over the entire circumference of the outer peripheral surface 14d of the valve seat 14. The fuel injection apparatus 1 is operative to allow the fuel which will be discharged through the gap between the valve element 12 and the valve seat 14 during valve opening to spread in a nearly radial fashion in the discharge-side passage 42, and then release the fuel to the space outside the casing 26 through the outlet 42a of the discharge-side passage 42. This enables the discharge-side passage 42 more reliably to ensure a large flow passage area. Therefore, the flow velocity of the fuel discharged through the gap between the valve element 12 and the valve seat 14 is more effectively reduced during valve opening. This can more effectively reduce fuel flowing noise.

The fuel injection apparatus 1 includes O-rings 44 placed between the valve element 12 and the casing 26. To be concrete, the O-rings 44 are positioned one between the valve element 12 and the casing 26 and the other between the valve element 12 and the non-magnetic bush 30. This can ensure good sealing property between the valve element 12 and the casing 26 and between the valve element 12 and the non-magnetic bush 30.

The casing 26 is provided with a side portion 26b placed outside the outer peripheral surface 14d of the valve seat 14. The outlet 42a of the discharge-side passage 42 is formed in the side portion 26b of the casing 26. This makes it possible to more rapidly release the fuel to the space outside the casing 26, thereby improving the effect of reducing fuel flowing noise. Further, the flow passage area of the outlet 42a can be sufficiently ensured as compared with the case where the outlet 42a of the discharge-side passage 42 is formed in the valve seat 14.

Next, Examples 2 to 4 will be explained, in which similar or identical components to those in Example 1 and different examples are assigned the same reference signs. Each of the examples will be described with a focus on differences from other examples.

Example 2

Figure 4:
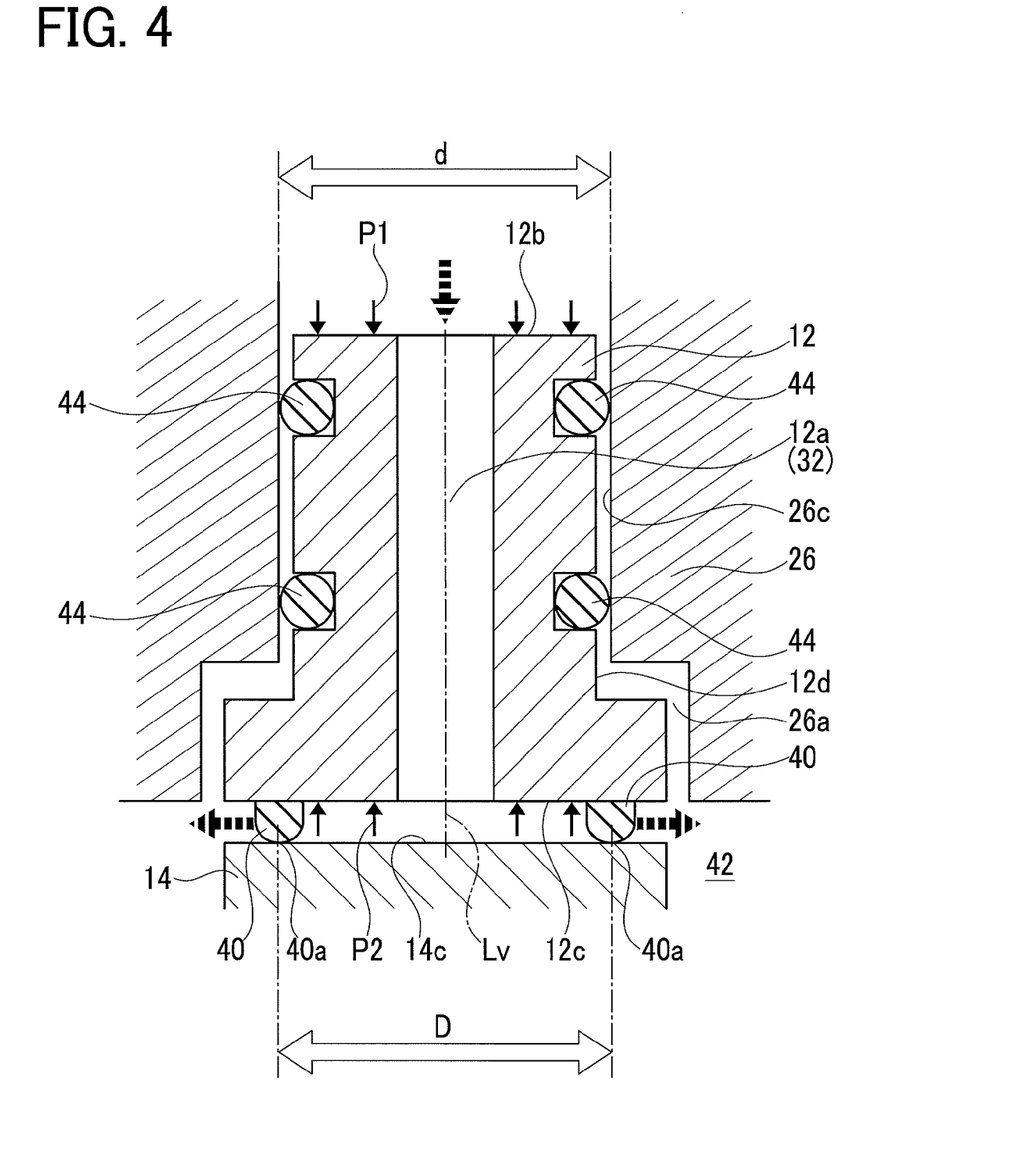
FIG. 4 is a schematic diagram of a valve seat and its surrounding parts during valve closing in Example 2.

In Example 2, a contact portion 40a of the seat sealing member 40 which can contact with the valve seat 14 and the O-rings 44 each have an annular shape centered at the central axis Lv of the valve element 12. As shown in FIG. 4, the diameter of the contact portion 40a of the seat sealing member 40, i.e., a seat sealing diameter D, is equal to the diameter d of the O-ring 44. FIG. 4 is a schematic diagram for explanation. In FIG. 4, dashed arrows indicate flowing directions of the fuel.

Accordingly, for example, the fuel pressure P1 acting on the upper end face 12b of the valve element 12 and the fuel pressure P2 acting on the lower end face 12c of the valve element 12 cancel out each other. During valve opening, accordingly, the driving force required to move the valve element 12 away from the valve seat 14 can be made small. This can reduce the size of the drive unit (e.g., the electromagnetic coil 28) of the valve element 12 and hence achieve downsizing of the fuel injection apparatus 1. The flow passage area of the fuel passage 32 can be made larger to increase a flow rate of the fuel.

Example 3

Figure 5:
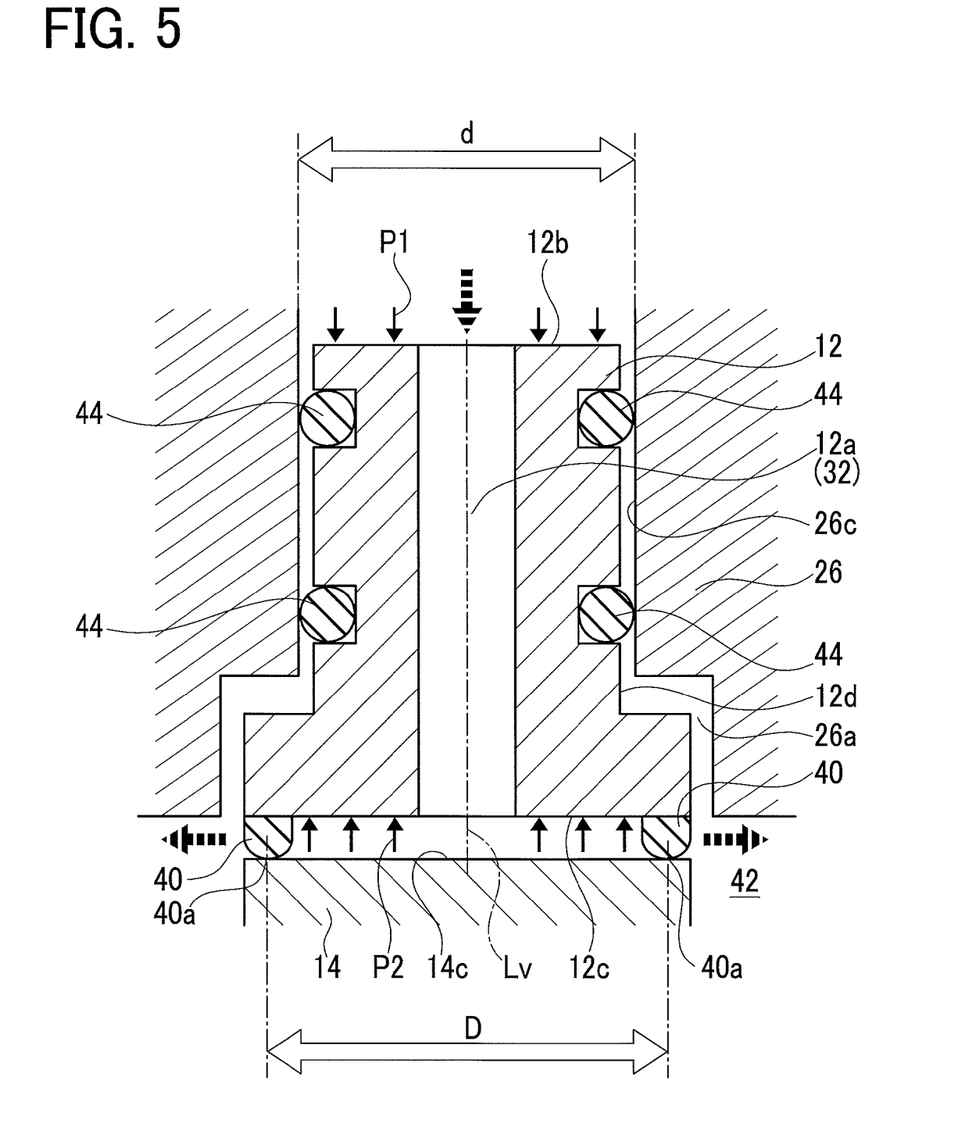
FIG. 5 is a schematic diagram of a valve seat and its surrounding parts during valve closing in Example 3.

In Example 3, as shown in FIG. 5, the seat sealing diameter D is larger than the diameter d of the O-ring 44. Accordingly, for example, the fuel pressure P1 acting on the upper end face 12b of the valve element 12 and part of the fuel pressure P2 acting on the lower end face 12c of the valve element 12 cancel out each other. During valve opening, accordingly, the driving force required to separate the valve element 12 from the valve seat 14 can be made small.

Further, a remaining part of the fuel pressure P2 acts in a direction to separate the valve element 12 from the valve seat 14 (a valve opening direction). This assists driving of the valve element 12 at the time of valve opening. Thus, the driving force required to separate the valve element 12 from the valve seat 14 can be further reduced. This can further reduce the size of the drive unit (e.g., the electromagnetic coil 28) of the valve element 12 and hence achieve further downsizing of the fuel injection apparatus 1. It is to be noted that FIG. 5 is a schematic diagram for explanation. In FIG. 5, dashed arrows indicate flowing directions of the fuel.

Example 4

Figure 6:
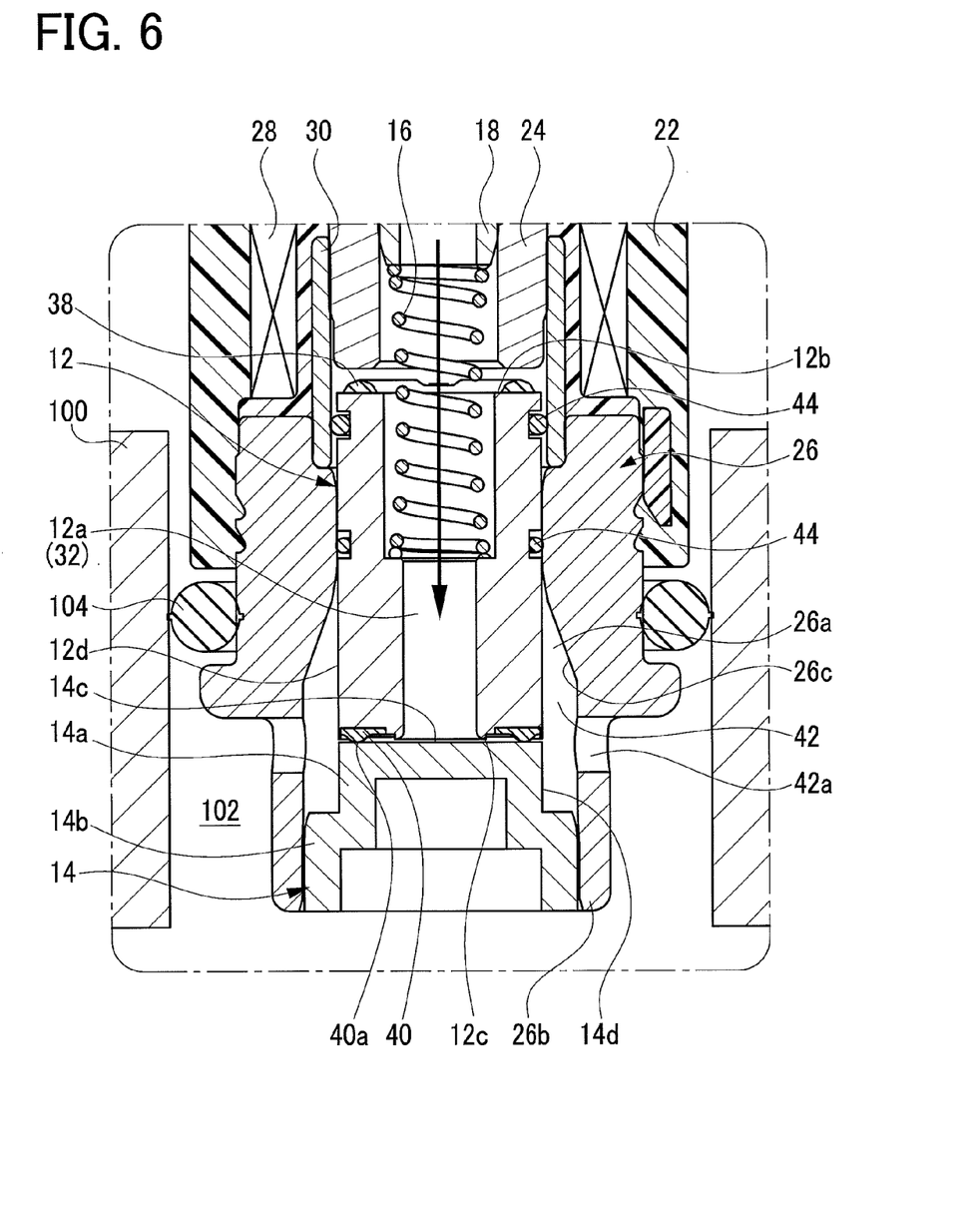
FIG. 6 is an enlarged view of a valve seat and its surrounding parts during valve opening in Example 4.

In Example 4, as shown in FIG. 6, the outlet 42a of the discharge-side passage 42 is formed in a position forward in a discharge direction (a right-left direction in FIG. 6) of the fuel to be discharged through the gap between the valve element 12 and the valve seat 14 during valve opening. Specifically, the outlet 42a of the discharge-side passage 42 is formed to extend in a horizontal direction with respect to an exit of the flow passage 12a of the valve element 12. Accordingly, the fuel to be discharged through the gap between the valve element 12 and the valve seat 14 can be released smoothly to the space outside the casing 26. Therefore, the effect of reducing fuel flowing noise can be more effectively improved.

The foregoing examples are mere example and do not particularly limit the present invention. The present invention may be embodied in other specific forms without departing from the essential characteristics thereof. For instance, the fuel injection apparatus 1 is also applicable to an apparatus for supplying natural gas or liquid fuel.

REFERENCE SIGNS LIST

1 Fuel injection apparatus
10 Main unit
12 Valve element
12a Flow passage
12c Lower end face
14 Valve seat
14a Small-diameter portion
14b Large-diameter portion
14c Seat surface
16 Compression spring
22 Housing
24 Stator core
24a Through hole
26 Casing
26a Through hole
26b Side portion
28 Electromagnetic coil
30 Non-magnetic bush
32 Fuel passage
40 Seat sealing member
40a Contact portion
42 Discharge-side flow passage
42a Outlet
44 O-ring
Lv Central axis
P1 Fuel pressure
P2 Fuel pressure
D Seat sealing diameter
d Diameter (of O-ring)

What is claimed is:

1. A fuel supply apparatus including a valve element having a through hole that provides a flow passage which allows fuel to flow therethrough, a valve seat which the valve element comes into contact with or separates from, and a casing accommodating the valve element and the valve seat,
    wherein the valve element is configured to separate from the valve seat during valve opening to allow the fuel flowing in the flow passage to be discharged through a gap between the valve element and the valve seat,
    wherein the fuel is allowed to flow in the same direction in the flow passage as a direction in which the valve seat is arranged with respect to the valve element,
    wherein the fuel supply apparatus further includes a discharge-side passage to allow the fuel to be discharged out during the valve opening, and
    wherein the discharge-side passage is provided outside of a radial-outward-facing peripheral portion of the valve seat.

2. The fuel supply apparatus according to claim 1, wherein
    the discharge-side passage is formed over an entire circumference of the outer peripheral portion of the valve seat to allow the fuel which will be discharged during the valve opening to spread in a nearly radial fashion in the discharge-side passage.

3. The fuel supply apparatus according to claim 1, further including a seal member placed between the valve element and the casing.

4. The fuel supply apparatus according to claim 3, wherein
    the valve element has a nearly cylindrical shape and includes a seat sealing member on a surface of the valve element on a side where the valve seat is arranged,
    the seat sealing member is provided with a contact portion that contacts with the valve seat during valve closing in which the valve element is held in contact with the valve seat,
    the seal member and the contact portion are formed in an annular shape centered on a central axis of the valve element, and
    the contact portion has a diameter equal to a diameter of the seal member.

5. The fuel supply apparatus according to claim 3, wherein
    the valve element has a nearly cylindrical shape and includes a seat sealing member on a surface of the valve element on a side where the valve seat is arranged,
    the seat sealing member is provided with a contact portion that contacts with the valve seat during valve closing in which the valve element is held in contact with the valve seat,
    the seal member and the contact portion are formed in an annular shape centered on a central axis of the valve element, and
    the contact portion has a diameter larger than a diameter of the seal member.

6. The fuel supply apparatus according to claim 1, wherein
    the casing is provided with a side portion placed outside of an outer peripheral portion of the valve seat, and
    the discharge-side passage has an outlet formed in the side portion.

7. The fuel supply apparatus according to claim 1, wherein
    the discharge-side passage has an outlet formed in a position forward in a discharging direction of the fuel to be discharged through a gap between the valve element and the valve seat during the valve opening.

8. The fuel supply apparatus according to claim 1, wherein
    the discharge-side passage extends alongside the valve seat outside of the radial-outward-facing peripheral portion of the valve seat.

* * * * *